United States Patent
Saadat

(10) Patent No.: US 8,235,438 B2
(45) Date of Patent: Aug. 7, 2012

(54) GRIPPER MECHANISM WITH SPLIT DRIVESHAFT FOR A GRIPPING FINGER

(75) Inventor: Fereshteh Saadat, Soest (DE)

(73) Assignee: M. Mohsen Saadat, Soest (DE)

( * ) Notice: Subject to any disclaimer, the term of this patent is extended or adjusted under 35 U.S.C. 154(b) by 225 days.

(21) Appl. No.: 12/531,285

(22) PCT Filed: Aug. 19, 2008

(86) PCT No.: PCT/DE2008/001365
§ 371 (c)(1),
(2), (4) Date: Sep. 14, 2009

(87) PCT Pub. No.: WO2009/024138
PCT Pub. Date: Feb. 26, 2009

(65) Prior Publication Data
US 2010/0096870 A1    Apr. 22, 2010

(30) Foreign Application Priority Data

Aug. 21, 2007   (DE) .......................... 10 2007 039 399

(51) Int. Cl.
*B25J 15/00*    (2006.01)
*B25J 15/08*    (2006.01)
*B25J 15/02*    (2006.01)

(52) U.S. Cl. ............................ 294/202; 294/115; 269/32
(58) Field of Classification Search .................. 294/86.4, 294/192, 198, 201, 202, 205, 115, 203; 269/32, 269/24, 27, 31, 229; 901/31, 37, 39
See application file for complete search history.

(56) References Cited

U.S. PATENT DOCUMENTS

| | | | | |
|---|---|---|---|---|
| 4,728,137 A * | 3/1988 | Hamed et al. | ................. | 294/202 |
| 4,744,596 A * | 5/1988 | Hiller et al. | ................... | 294/115 |
| 5,072,652 A * | 12/1991 | Blatt | ............................. | 294/202 |
| 5,884,952 A * | 3/1999 | Chadwick | ..................... | 294/202 |
| 6,244,644 B1 | 6/2001 | Lovchik | | |

FOREIGN PATENT DOCUMENTS

| | | |
|---|---|---|
| DE | 316522 C | 12/1919 |
| DE | 3841041 A1 | 7/1989 |
| DE | 4014002 A1 | 10/1991 |
| DE | 20021296 U1 | 5/2001 |
| DE | 102004056229 | 5/2006 |
| JP | 03195313 A | 8/1991 |
| SU | 1337251 A1 | 9/1987 |

* cited by examiner

*Primary Examiner* — Paul T Chin
(74) *Attorney, Agent, or Firm* — McNeely, Hare & War LLP; James E. Mrose

(57) ABSTRACT

A gripper mechanism for machines, robots and manipulation devices, comprising at least one moving gripping finger, driven by a driveshaft of multiple parts, a crank, belt or gear shaft, wherein the centering of the parts relative to each other and the transmission of the torque from a driving part to the next part, up to the gripping finger, is achieved by means of axial toothing, preferably a pinion gearing with pins and drillings. The driveshaft is preferably provided with a carrying support bearing. As a result of the splitting of the driveshaft, it is possible to cast the housing in one piece with two cavities for housing the operating unit and the transmission. The gripping finger or the lever driving the gripping finger are externally fixed to the driveshaft in an axial manner.

21 Claims, 7 Drawing Sheets

GRIPPER MECHANISM WITH SPLIT DRIVESHAFT FOR A GRIPPING FINGER

CROSS-REFERENCE TO RELATED APPLICATION

This application is an U.S. national phase application under 35 U.S.C. §371 based upon co-pending International Application No. PCT/DE2008/001365 filed on Aug. 19, 2008. Additionally, this U.S. national phase application claims the benefit of priority of co-pending International Application No. PCT/DE2008/001365 filed on Aug. 19, 2008 and German Application No. 10 2007 039 399.9 filed on Aug. 21, 2007. The entire disclosures of the prior applications are incorporated herein by reference. The international application was published on Feb. 26, 2009 under Publication No. WO 2009/024138.

BACKGROUND OF THE INVENTION

1. Field of the Invention

The invention relates to a gripper mechanism for machines, robots and handling equipment with at least one movable gripping finger which is driven by at least one driveshaft, crank, gear wheel, tooth belt or chain sprocket shaft, wherein the driveshaft, crank, gear wheel, tooth belt or chain sprocket shaft is of multiple-section design and is axially and radially mounted in the structure on both sides by a "fixed-loose"—or a journal bearing in such manner that at least one of the bearing journals on both sides of the driveshaft is formed as a separate neck bearing on a gripping finger and/or on a connecting bar of the gripper mechanism which drives the gripping finger, and the centering of the components of the sections of the driveshaft in relation to one another as well as the transmission of the torque from the driveshaft to the gripping fingers or other elements of the gripper mechanism takes place by way of an end-faced axial tooth intermeshing or axial pin connection of the portions in relation to one another.

2. Description of the Prior Art

Gripper mechanisms, the gripping fingers of which are set into rotary motion by a crank or a tooth gear, as a rule, comprise a crank or tooth gear shaft with bearing journals on both sides as an integral unit, the shaft ends of which, for purposes of torque transmission, project from the transmission and transmit the torque by means of known shaft-hub-connections onto other members of the gripper mechanism. For assembly reasons the casing of such gripper mechanisms is composed of a plurality of parts which are bolted together. Their manufacture is cumbersome and their assembly is particularly cumbersome. When work pieces are gripped, the flow of forces passes from the gripping finger by way of the fastener elements of the casing components and endeavors to force these apart. Moreover, the fixation and the transmission of the torque between the crank or tooth gear shaft, being an integral unit, and the other members of the gripper mechanism is tied in an unchangeable manner to a specific position of the driveshaft.

SUMMARY OF THE INVENTION

Against this background, the invention is based on the object to manufacture the casing, including its forces- and torque-transmitting parts to be resistant to bending and torque and also in a favorable manner assembly- and cost-wise from an integral work piece and, moreover, to provide the connection between the driving member, crank, tooth gear, chain or belt pulley and the driven member of the gripper mechanism simply, reliably and, as regards its twisting angle, rigid yet variable in order to permit the broadest possible usability of this particular gripper mechanism.

This object is attained according to the invention by means of the features set out in claim 1.

The subsidiary claims represent advantageous further modifications of the invention.

Because of the splitting of the driveshaft or rotary axle into a plurality of at least two separate sections of which the two outermost sections each comprise a bearing, the assembly of the driveshaft or rotary axle with the gripper members fitted thereto is made possible without dividing the casing. Preferably, the driveshaft is divided into three sections, a driven central section in the form of a crank or tooth gear, chain pulley or belt pulley with axial tooth intermeshing on both sides as well as with or without axial bearing surfaces for a journal bearing support in X-configuration and two separate bearing journals in the form of neck bearings in separate parts of the gripper mechanism with axial tooth intermeshing as well as with or without axial bearing surfaces as an alternative to a journal bearing support of the driveshaft in O-configuration.

The axial tooth intermeshing of the sections which may also be provided in the form of a stub tooth intermeshing by means of bores and pins, takes care of the positive interengagement and centering of the sections in relation to one another and provides the torsionally rigid transmission of the torque from one section to another section of the driveshaft, yet allowing for a variable twisting angle.

The bearing journals of the driveshaft on both sides may also include axial bores therethrough, which serve for the passage of the pins from the bores of the central section of the driveshaft all the way into the bores of the driven gripping finger or the connecting bar which drives the gripping finger. Thus, the driveshaft may be composed of two sections, (a central drive section together with a bearing journal and on one side a gripping finger, together with a neck bearing), or of up to five sections, (a first gripping finger half, a first bearing journal, a central drive section, a second bearing journal and a second gripping finger half), all of which are interconnected by axial pin connections, preferably by continuous long pins.

The connection of the sections of the multi-sectional driveshaft or the multi-sectional rotary axle to one another may also be brought about by frictional interengagement with the aid of conically-shaped shaft and hub connections. The advantage of a frictional engagement resides, on the one hand, in that the sections can be interconnected in relation to one another infinitely variably, and, on the other hand, this kind of connection, in the event of an accidental collision when in use, acts as a kind of frictional clutch and protects the components against breakage.

In its most simple embodiment, a gripper mechanism according to the invention comprises on one side or both sides a movable gripping finger fitted to the multiple-section-designed driveshaft, crank shaft, tooth gear shaft, belt pulley shaft or chain pulley shaft, which, serving as a clamping device, operates in opposition to a fixed gripper or machine component. In the event that the gripper mechanism comprises a gripping finger fitted on one side to the driveshaft, at least the one neck bearing with or without axial bearing surface is provided on this gripping finger. The second neck bearing forms a free-wheeling simple swivel part serving as an end support bearing with axial intermeshing with or without axial bearing surface. Both neck bearings, finger bearings and end support bearings have a common axis and form the axis of rotation of the driveshaft.

In the event that the gripper mechanism has a gripping finger fitted to both sides of the driveshaft, both radial bearings with end-facing axial tooth intermeshing, with or without axial bearing surface, are accommodated as neck bearings in the two finger halves or in driven connecting bar members which drive the gripping finger.

The casing of a so designed gripper mechanism may be machined from the solid or be cast in one integral piece. It comprises two interconnected cavities for the accommodation of the actuating unit, such as e.g. a piston and piston rod for the pneumatic operation on the one hand, and for the accommodation of the driveshaft of a toothed shaft or of the entire transmission unit in the event of articulated linkage systems on the other hand. After fitting the actuating unit and the introduction of the transmission unit without neck bearings into the cavities provided therefor, the cavities are closed using appropriate covers and fastening elements or stoppers. Finally, the gripping fingers or the driven connecting bar components with the neck bearings provided thereon on both sides or on one side, with end support bearings on the other side are inserted into the bores of the casing from the outside and are fitted axially to the other section or other sections of the driveshaft in form-fitting or frictional engagement. At this stage finally the driveshaft and jointly therewith the transmission unit is completely mounted in its bearings. The transmission space is closed hermetically by means of a cover or a stopper. In the event of the gripping finger on one side only, a free-wheeling thrust bearing serving as an end support bearing forms the second bearing journal of the driveshaft. By the pitch of the axial tooth intermeshing or bores and pins of the neck bearings and the central section of the driveshaft it is possible to vary the positioning of the gripping fingers and that of the driven connecting bars in relation to the driving unit. In this manner, the opening and closing position of the gripping fingers becomes variable.

When using as axial bearings journal-type radial bearings with a bearing collar, the end face sides of the central section of the driveshaft are designed as axial bearings for a journal bearing support of the X-configuration. They find support against the bearing collar of the sliding bearing inserted into the casing from inside. In the case of the O-configuration of the axial journal bearing support of the driveshaft or of the rotary axle, the axial bearing surfaces thereof are located at the outwardly positioned end face sides of the bearing journals of the neck bearings and end support bearings on both sides. Where a finger is provided on one side only, the entire torque of the driveshaft is transmitted from one side onto the gripping finger. The end support bearing revolves torquelessly.

For applications where a relatively broad jaw is required, a second gripping finger half or connecting bar half in mirror-image relationship to the first one is fitted instead of the end support bearing to the internal sections of the driveshaft and is fixed outside of the gripper casing to the gripping finger by way of an intermediate member serving as a jaw mounting means, or by way of an articulation. Both finger or connecting bar members, jointly with the jaw mounting means or gripping finger on the one side and at the central section or components of the driveshaft or the rotary axle on the other side result in an integrated gripping finger or finger mechanism which resists bending and torsional deformation. In that case, the driveshaft is loaded symmetrically on both sides. Half of the torque is applied to each of the two sides.

For use in dusty environments and applications where protection against explosion is needed, flat axial seals are employed at the end of the neck bearings and end support bearings outside of the bearing areas, but below the gripping finger or the connecting bar and the head of the end support bearing.

In all cases the positions of the gripping fingers or of the driven connecting bars serving as driven members, in relation to the central section of the driveshaft serving as the driving member, may be varied as desired or required in respect of the end face intermeshing tooth pitch or the pitch of the pin bores in order to adapt the gripping range of individual gripping fingers to the particular application.

In the case of a gripper mechanism having two or more gripping fingers, a corresponding number of multiple-section drive shafts and/or rotary axles according to the invention are provided which are placed concentrically about the actuating unit and, with a single drive means, are necessarily operated synchronously.

A further advantageous embodiment of the invention provides gripper mechanisms, each comprising two driven drive shafts per moving gripping finger.

The gripper members, also referred to as connecting bars, connected on one side or both sides to the multiple-section drive shafts, together with the neck bearings, guide at their free ends the gripping finger as a coupler of an articulated linkage system. Whereas the first connecting bar connected to the first driveshaft is connected pivotally to the gripping finger, the second connecting bar connected to the second driveshaft is connected by way of a sliding linkage or by way of a smaller connecting bar, a binary member, pivotally to the gripping finger.

The sliding linkage may be provided in the gripping finger or in the connecting bar, connected to the driveshaft. It may adopt optional trajectory configurations in order to additionally swing the gripping finger during its movement within certain limits.

A thus designed gripper mechanism, comprising two synchronously driven shafts per gripping finger, guides the gripping finger as a coupling of a multiple-member articulated linkage system even through and beyond the extended and final position of the gripping finger together with the driven connecting bars, securely and unambiguously without tilting over or jamming. This allows a range of movement to be achieved which may go far beyond the conventional 90° swiveling per gripping finger.

Accordingly, the gripping fingers may thus, even in the case of parallel movement, swing backwardly out of the space ahead of the gripping body by more than 180° to render the space ahead of the gripper available for other purposes. In the case of parallel finger movement, where both connecting bars, guiding the gripping finger, are of equal length and parallel to one another, the sliding linkage guide may be dispensed with entirely. In that case the second connecting bar, driven by the second driveshaft, guides the gripping finger likewise by way of a simple hinge joint. If the linkage quadrangle, comprising the gripping finger, connecting member of the two drive shafts as well as both connecting bars driven by the drive shafts, is not required to move beyond its extended and final position, it is possible for one of the two drive shafts to be dispensed with and that one to be replaced by a co-revolving rotary axle.

BRIEF DESCRIPTION OF THE DRAWINGS

In detail there is shown in.

Identical components are denoted by identical reference numbers or identical reference letters. Indices denote different regions, different designs or multiple uses of one and the same element.

DESCRIPTION OF THE PREFERRED EMBODIMENT

Figure 1:
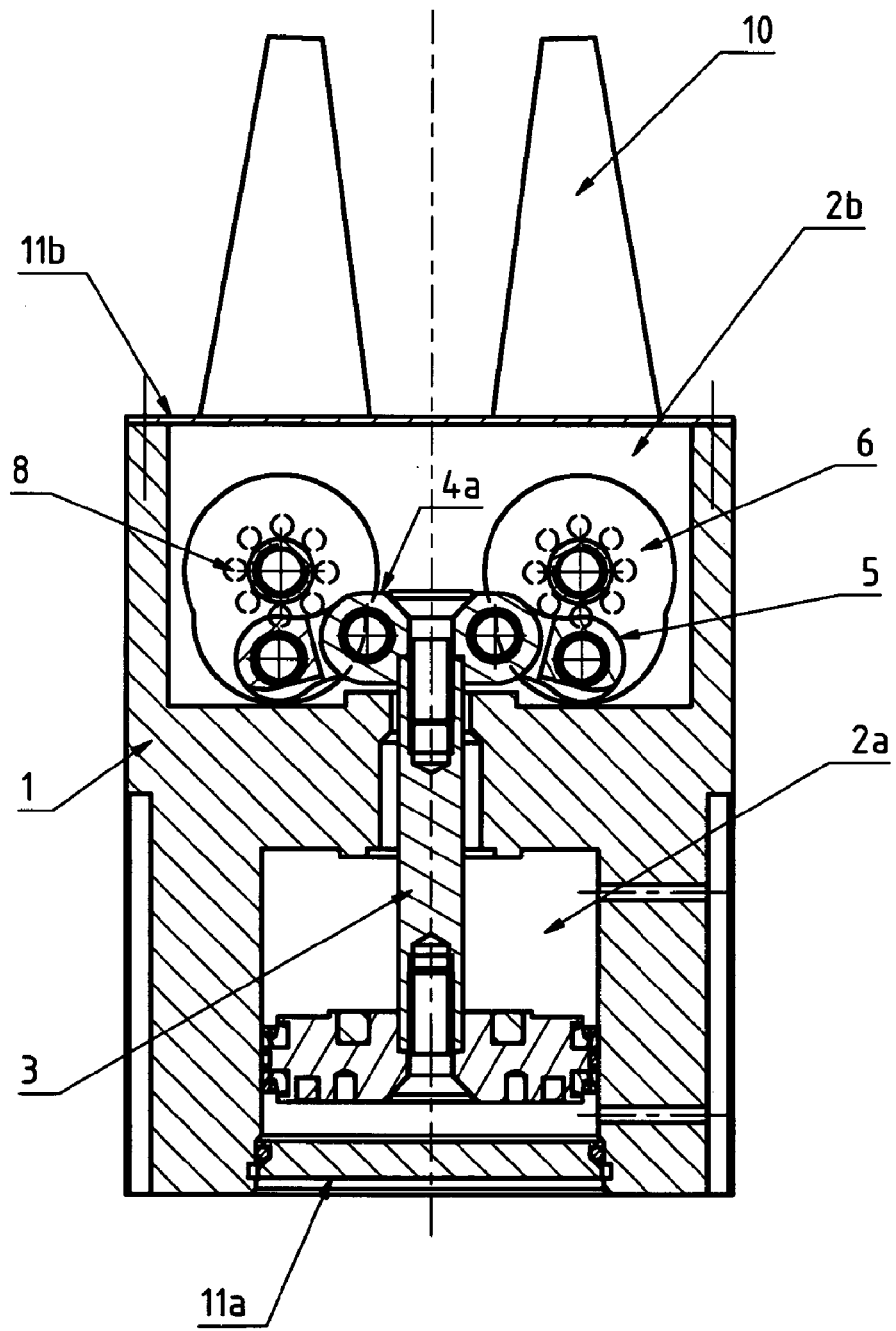
FIG. 1 the longitudinal section through the casing of the gripper mechanism according to the invention, comprising two pneumatically driven drive shafts of multiple-section design.

In accordance with FIG. 1 the gripper mechanism comprises a casing (1) having two coaxial cavities (2a, 2b). In the cylindrical cavity (2a) a piston and piston rod unit (3) is accommodated as an actuating unit and is sealed in by the cover (11a). In the transmission cavity (2b) the transmission unit, comprising at least one slider-crank mechanism or at least one gear wheel and tooth rack unit or one worm and worm wheel unit is accommodated. The piston rod, by means of a slider (4a) and a coupler member (5), drives the central section of the driveshaft (6), composed of three sections, acting as a crank shaft. The torque is transmitted by the central section acting as crank of the driveshaft (6), by way of tooth intermeshing on the end face side brought about by bores and pins (8), onto the gripping finger (10). The central section of the driveshaft (6) on both sides has two plane surfaces comprising the bores for accommodating the pins (8) and can accordingly be inserted through the opening on one side of the gripper casing into the transmission cavity (2b). Portions of these plane surfaces may serve as axial bearings for the driveshaft (6). The transmission cavity (2b) may also be represented by a simple bore in which a toothed shaft serving as the driveshaft (6) is accommodated and is driven by a toothed piston rod.

Figure 2:
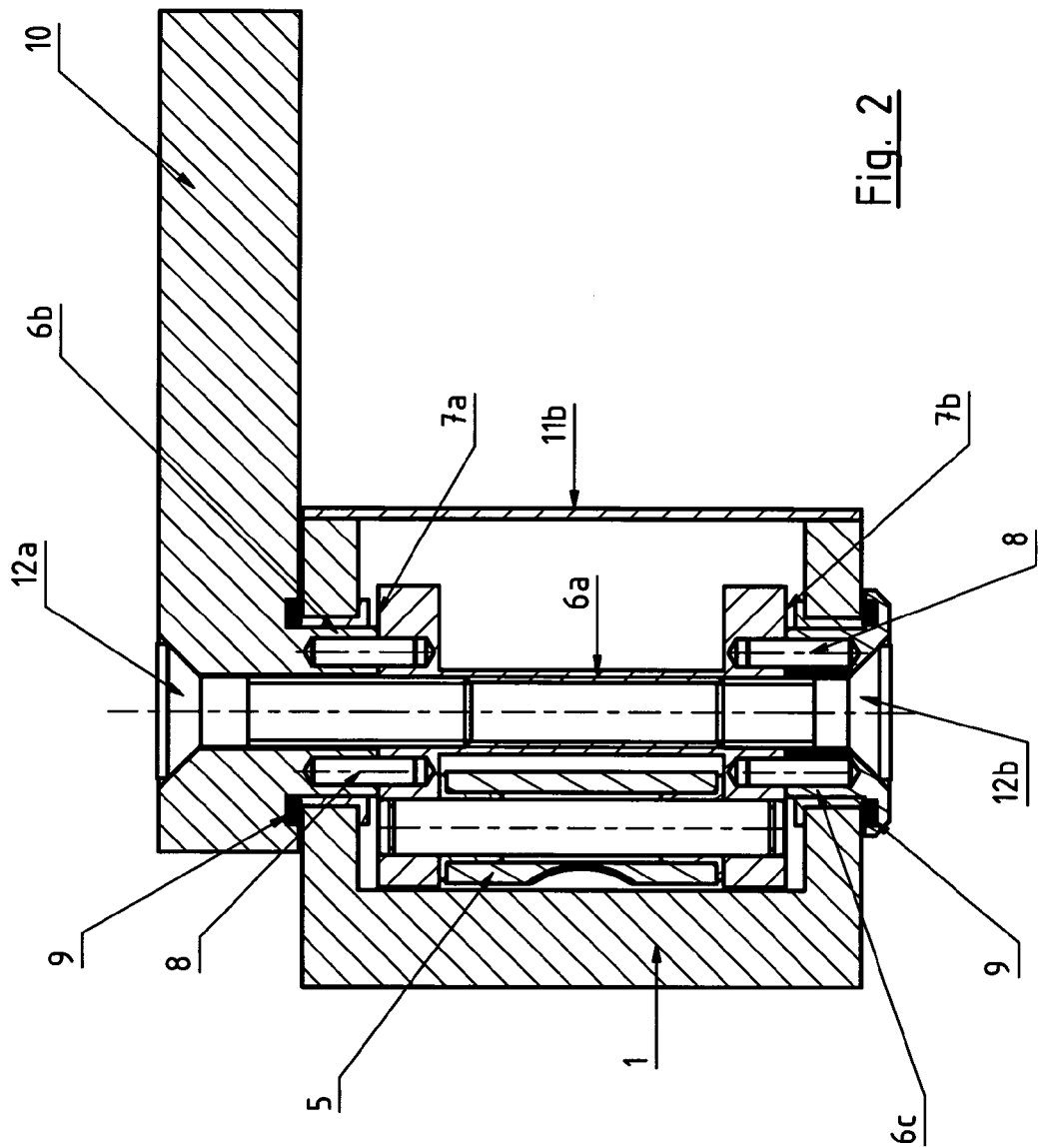
FIG. 2 the cross-section through a crank shaft in three sections serving as driveshaft of a gripping mechanism according to the invention with finger means provided on one side only.

According to FIG. 2 the driveshaft (6) comprises three sections (6a, 6b, 6c) and is supported by a journal bearing of the X-configuration. The central section of the driveshaft, the crank (6a), is provided on both sides with two surfaces (7a, 7b) serving as axial bearing surfaces of the journal bearing support. In the center of these bearing surfaces, bores are provided on both sides which accommodate the neck bearing (6b) of the gripping finger and of the end support bearing (6c) by means of pins (8), to center it and by way of these pins or by means of other kinds of tooth-meshing transmit the torque of the driveshaft (6) to the gripping finger (10). The radial bearing of the driveshaft (6) in the gripper casing (1) is fitted on one side as a neck bearing (6b) to the gripping finger (10) and on the other side as a separate end support bearing (6c). This permits the pre assembled transmission, comprising the slider (4a), couplers (5) and cranks (6a) to be inserted through the front aperture in the gripper casing (1), to be connected to the piston rod of the actuating unit (3), followed by sealing of the cavity by means of the cover (11b). After the insertion of the gripping finger (10) with the axial sealing ring (9) and the neck bearing (6b) provided on the gripping finger (1) from the one side and the end support bearing (6c) with the axial sealing ring (9) from the other and their axial fixation by means of screws (12a, 12b) through the hollow center, the driveshaft (6) including its bearing mountings is completely assembled. The journal bearing mounting of the driveshaft may also be brought about in an O-configuration. In that case, the axial bearing surfaces are provided on the neck of the gripping finger (10) and of the end support bearing (6c) outside of the casing within the axial sealing rings (9).

Figure 3:
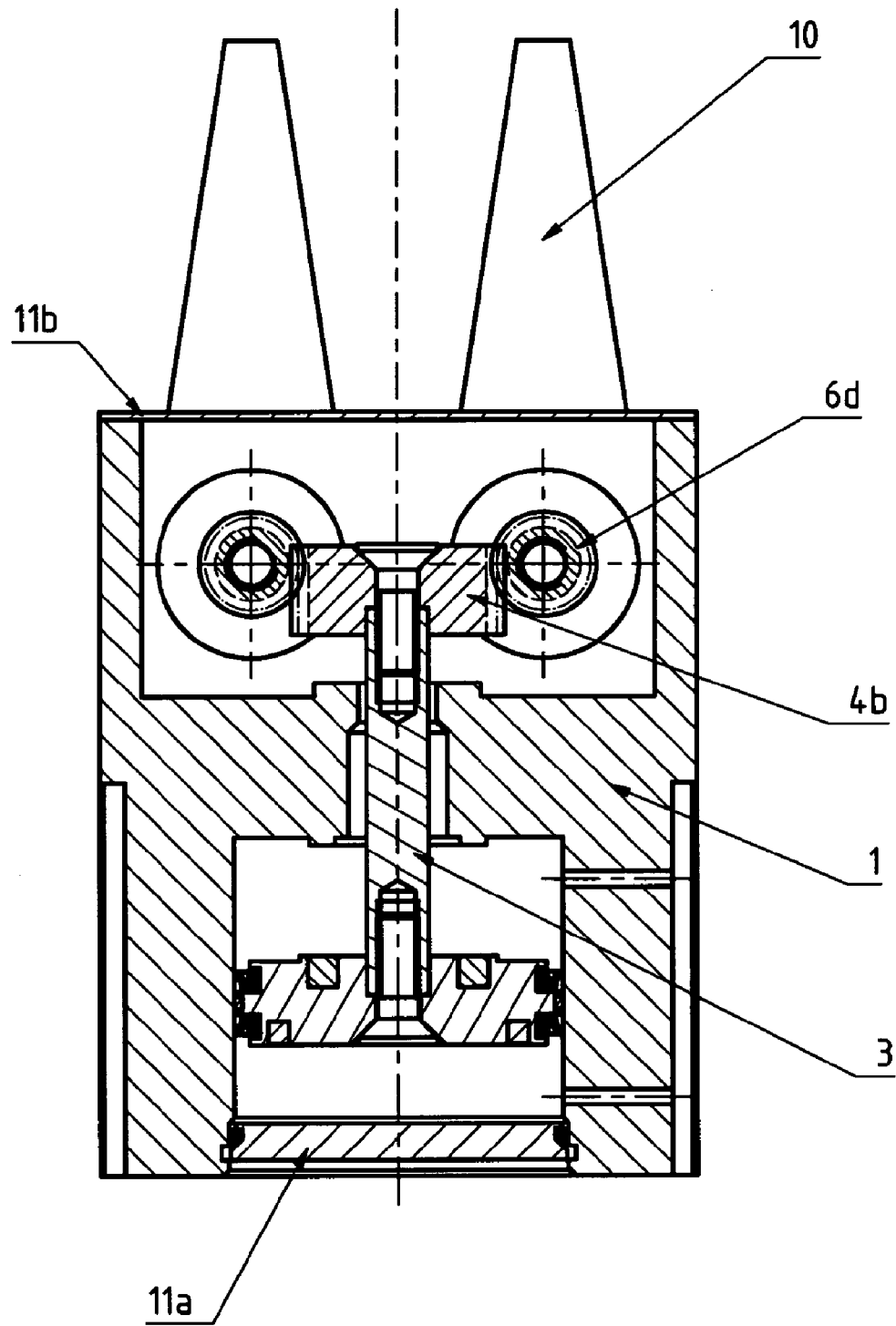
FIG. 3 the longitudinal section through the casing of a gripper mechanism according to the invention, comprising a gear wheel or pinion shaft designed in at least two sections, serving as driveshaft and a tooth rack connected to a cylinder-piston-unit serving as a drive unit.

In accordance with FIG. 3 the gripping fingers (10) are each driven by a driveshaft (6d) provided in two or three sections, carrying tooth formations, forming a gear wheel shaft. At the end of the piston-piston rod unit (3) a tooth rack (4b) provided in the form of a slider which drives the driveshaft (6d) having tooth formations and by means thereof drives the gripping finger (10). The tooth rack (4b) and the toothed driveshaft (6d) may also be replaced by a worm and a worm wheel in order to impart a rotary actuation, e.g. by way of an electric motor. In this case as well the toothed driveshaft (6d) is mounted at both ends axially and radially in the gripper casing (1), the neck bearing (6b) being provided as a component of the gripping finger (10) on the latter and the end support bearing (6c) being provided separately on the opposite side of the gripping finger. Where the toothed driveshaft (6d) is designed in two sections, the toothed central section is provided either on the neck bearing (6b) or on the end support bearing (6c). The pitch of the toothed driveshaft may in the case of a spur toothing be brought about within the region of the tooth formations, such that the tooth intermeshing is composed of two halves which are axially connected to one another by pins or are otherwise fixed. Where the toothed driveshaft (6d) is divided in two, the neck bearing (6b) and/or the end support bearing (6c) is of larger diameter than the circular head diameter of the tooth formations. In that case, the transmission cavity (2b) is formed exclusively by bores for the tooth rack of the drive unit (3) as well as the drive shafts (6).

Figure 4:
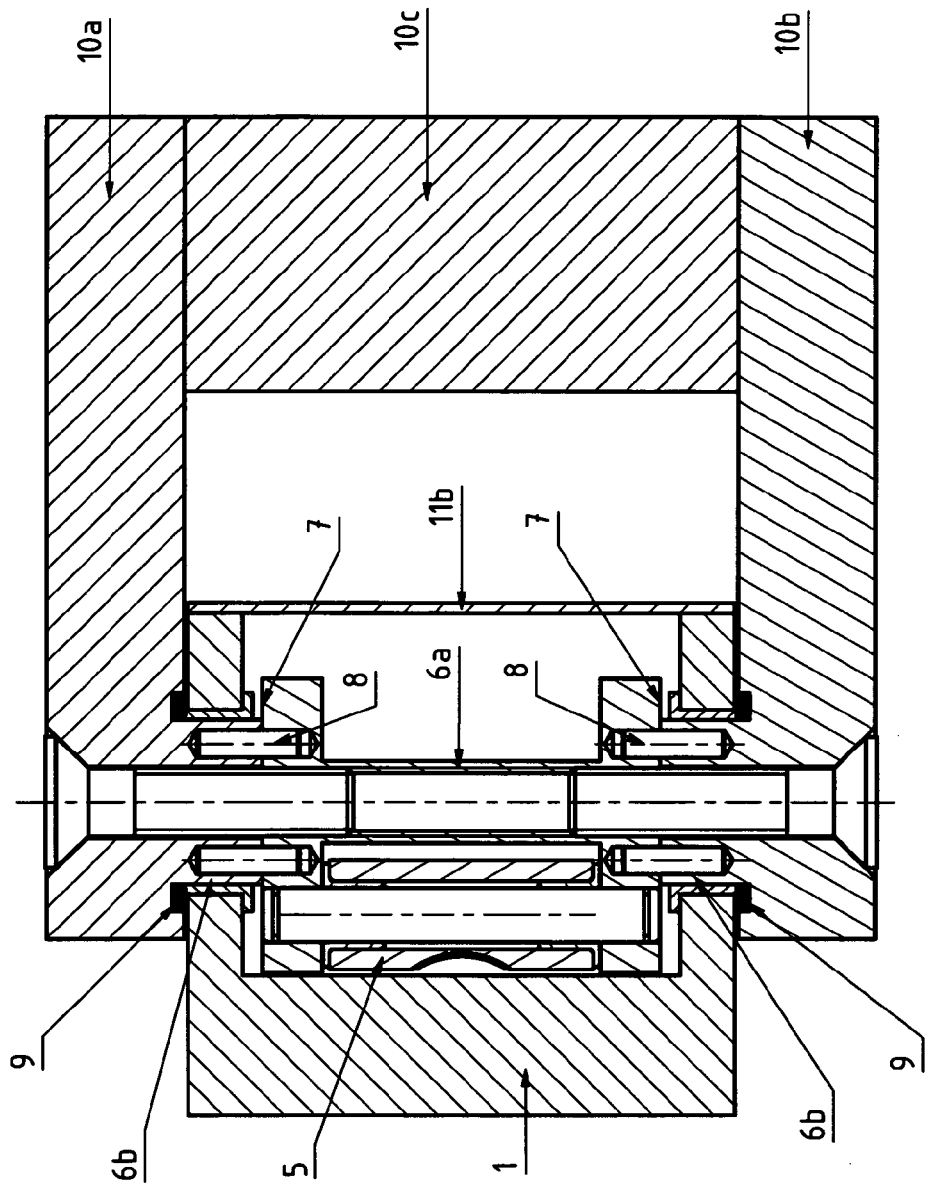
FIG. 4 the cross-section through a crank shaft in three sections serving as a driveshaft of a gripper mechanism according to the invention, comprising fingers arranged on both sides and a jaw mounting member designed as a connecting member between the two finger halves.

In accordance with FIG. 4 the gripping finger is composed of two halves (10a, 10b) provided on opposite sides of the casing and interconnected in a releasable manner outside the range of the casing by means of the jaw mounting member (10c). Each gripping finger half (10a, 10b) comprises a neck bearing (6b) of the driveshaft, crank or gear wheel shaft, an axial sealing ring (9) and, in the case of an O-configuration, also an axial bearing surface of the journal bearing support. The central section (6a) of the driveshaft forms jointly with the finger members (10a, 10b) and the jaw mounting member (10c) a closed unit which resists bending and torsional deformation. The gripping finger halves (10a, 10b) with the aid of their integrated neck bearings (6b) and their pins (8) or axial tooth formations support and center the central section (6a) of the driveshaft and form by means of its axial bearing surfaces (7) and the jaw mounting member (10c) a completely closed gripping finger which resists bending and torsional deformation and which in relation to its driveshaft, crank or gear wheel shaft is angularly adjustable within the range of pitching of the pins (8).

Figure 5:
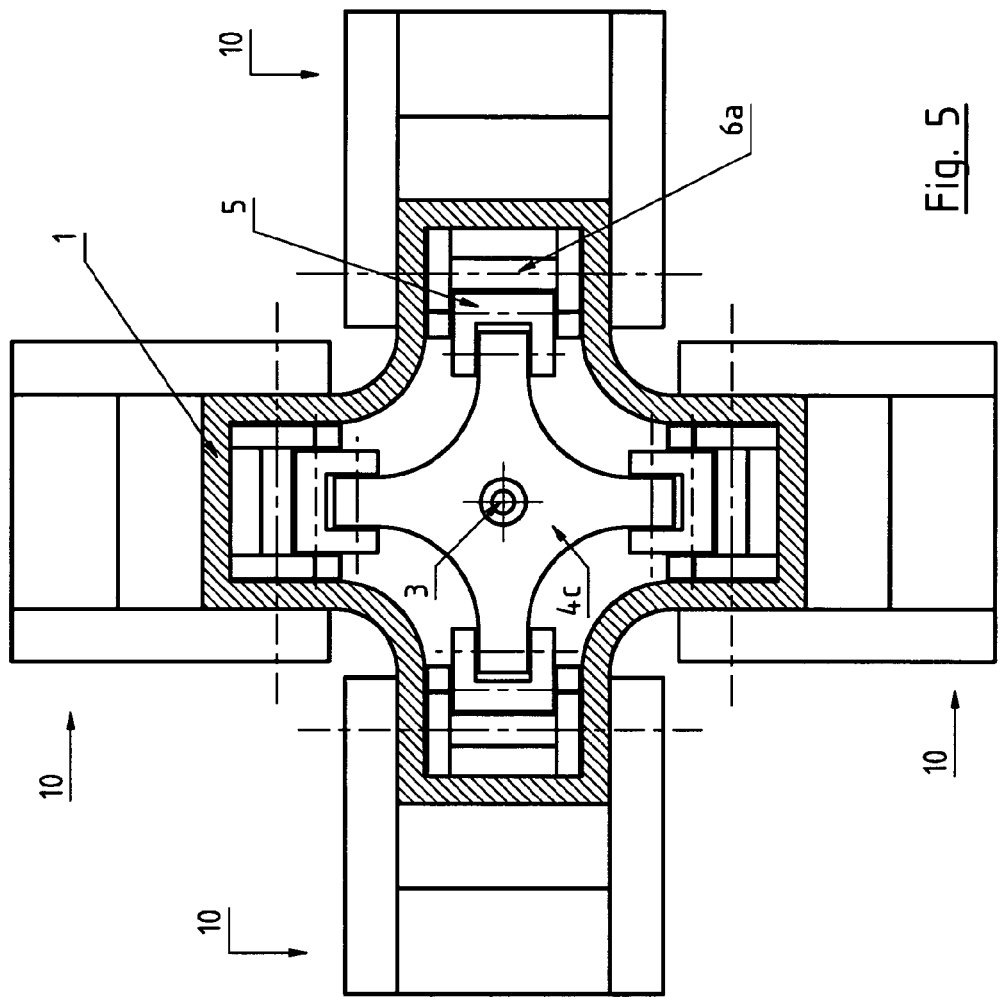
FIG. 5 the front elevation into the transmission cavity of a gripper mechanism according to the invention, comprising four drive shafts, each designed in three sections, for four gripping fingers provided on both sides.

In accordance with FIG. 5 a plurality of gripping fingers (10) may be provided around the central actuating unit (3), all of these being driven with the aid of a single centrally located slider (4c) and a crank or gear wheel shaft pneumatically, hydraulically or by electric motor synchronously.

Figure 6:
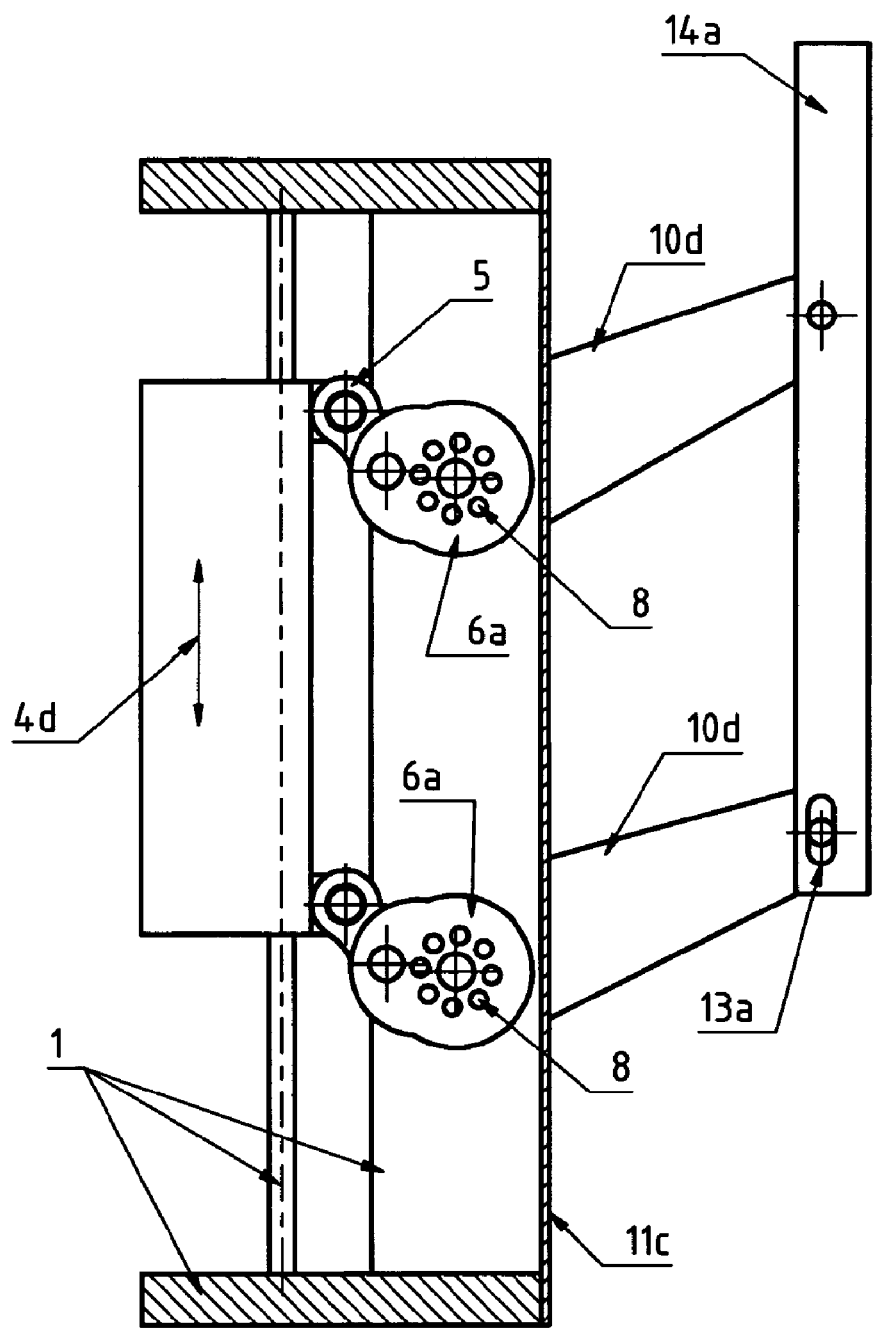
FIG. 6 a longitudinal section through a gripper mechanism according to the invention, comprising for each gripping finger two crank shafts of multiple-section design serving as drive shafts.

In accordance with FIG. 6 two drive shafts (6) composed of multiple sections, in this case designed as crank shafts, each actuate a connecting bar (10d) to the ends of which a gripping finger (14a) has been hinged. Whereas one of the connecting bars is connected to the gripping finger by a pivoting joint, the second connecting bar has a linkage pin by means of which it engages into a sliding linkage (13a) of the gripping finger (14a). This allows the connecting bars (10d) to be of different lengths or the cranks (6a) to perform different swiveling angles in order to lend to the gripping finger (14a) an additional rotation during the opening or closing procedure. The trajectory configuration of the sliding linkage (13a) as well may permit the gripping finger to perform additional movement, that is to say for each gripping finger a different movement if the handling task so requires. The sliding linkage (13a) may alternatively be provided on one of the two connecting bars (10d), in which case the gripping finger (14a) will merely comprise two pivoting joints. If the two connecting bars (10d) are parallel and of equal length, the sliding linkage on the gripping finger (14a) or on the connecting bar (10d) may be dispensed with. When dispensing with the sliding linkage (13a) the external drive of one of the two connecting bar (10d) may likewise be dispensed with, for as long as the thus resulting articulated quadrangle (1, 10d, 14a, 10d) does not move into its final or extended position. The gripping finger (14a) driven by two connecting bars (10d) is able even in its extended or final position in relation to the connecting bars (10d) to move onwards unambiguously and securely and transmit forces and torque onto the gripped object while doing so.

The linear actuating unit (4d) may be driven pneumatically, hydraulically or electro-motorically. It drives the cranks (6a) of the drive shafts (6) by way of the coupler member (5) and may be divided into two separate drives in tandem or coaxial arrangement and coupled to one another by positive or non-positive or frictional interengagement in order to drive the two connecting bars (10d) partly jointly and partly separately from one another. The cover (11c) closes the transmission cavity hermetically so that the entire gripper mechanism is completely sealed.

Figure 7:
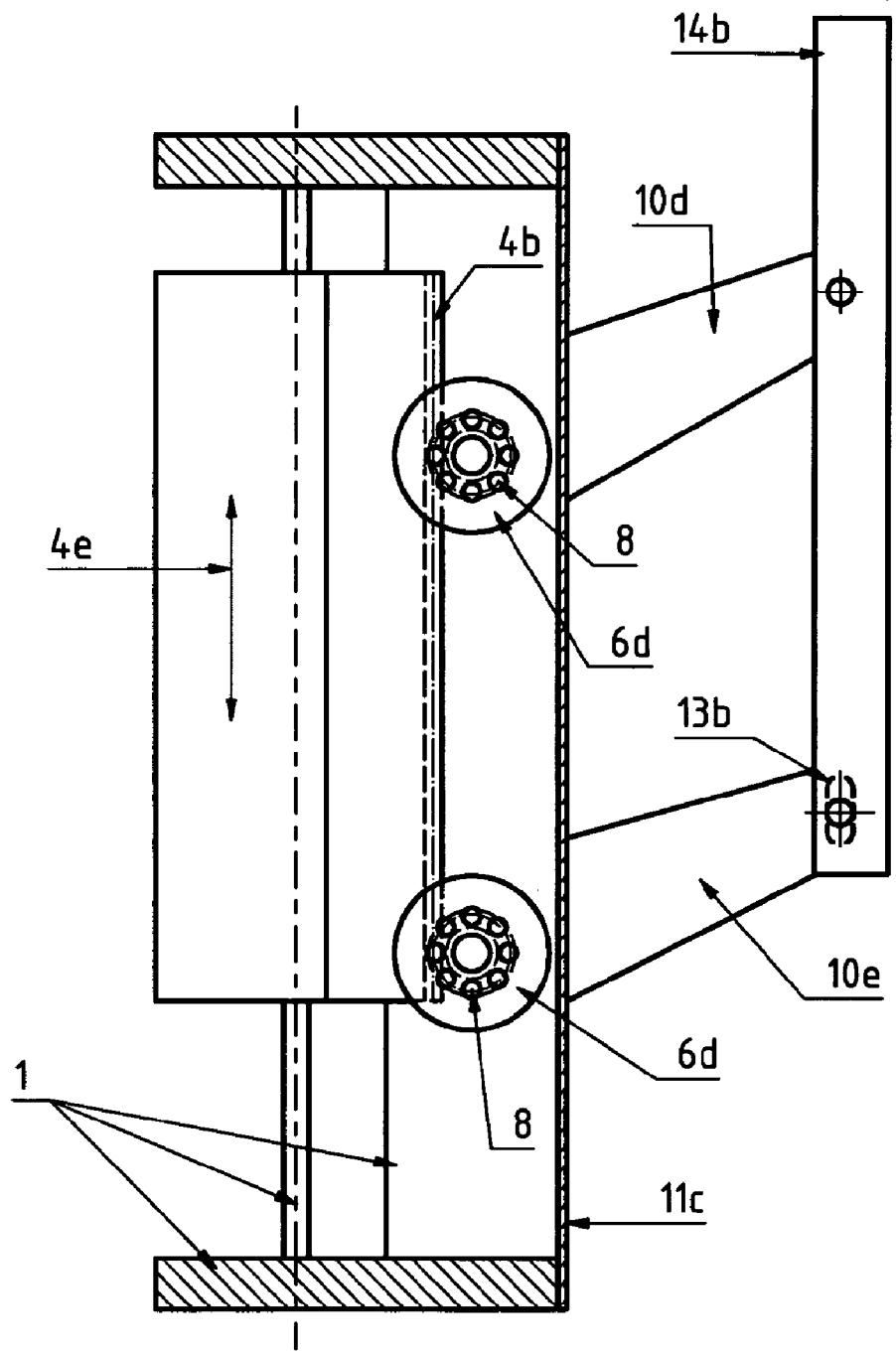
FIG. 7 a longitudinal section through a gripper mechanism according to the invention, comprising for each gripping finger two gear wheel shafts of multiple-section design serving as drive shafts.

According to FIG. 7 the linearly driven slider (4e) with its tooth rack (4b) imparts rotary movement to two drive shafts (6d) of multi-sectional and toothed design. The radial bearings of the toothed drive shafts (6d) are provided in the form of neck bearings (6b) on the connecting bars (10d, 10e) and are connected angularly adjustable with the aid of bores and pins (8) to the toothed portion of the driveshaft. The connecting bar (10d) engages at its end the gripping finger (14b) by way of an articulation. The connecting bar (10e) is provided at its end with a sliding linkage (13b) into which the linkage pin of the gripping finger (14b) engages. The sliding linkage (13b) may be replaced by a binary member, comprising a small connecting bar with rotary linkage on both sides, not illustrated. Kinematically, this gripper mechanism performs in a similar manner to what has been described in FIG. 6. Here as well the drive by the second driveshaft may be dispensed with under the same conditions as described with reference to FIG. 6.

The actuation of the second driveshaft may also be performed by a toothed belt or a chain by way of the first driveshaft.

The features of the invention disclosed in the description, the drawings and the claims may individually as well as in optional combination be of importance for practicing the invention.

All disclosed features are important to the invention.

The invention claimed is:

1. A gripper mechanism for machines, robots and handling equipment, said gripper mechanism comprising:
    at least one moving gripping finger having a neck, or being driven by a connecting bar comprising a neck;
    at least one drive shaft attachable to said gripping finger and adapted to actuate said gripping finger in a rotary motion, said drive shaft comprising at least a central section, and two axial surfaces on both sides of said central section;
    a plurality of pins received in bores defined in said neck of said gripping finger or of said connecting bar and in at least one of said two axial surfaces of said central section of said drive shaft, said pins being configured to removably connect said neck of said gripping finger or of said connecting bar to said central section of said drive shaft, said pins further being configured to transmit torque from said central section of said drive shaft to said gripping finger; and
    a slider driven by an actuating unit and attachable to said drive shaft, said slider being adapted to cause rotary motion to said drive shaft.

2. The gripper mechanism according to claim 1 further comprising a gripper casing comprising one integral piece having two interconnected cavities for the accommodation of said actuating unit in a first cavity and said drive shaft and said slider in a second cavity.

3. The gripper mechanism according to claim 2, wherein said drive shaft comprises said central section and two side sections, said central section having said axial surfaces, said axial surfaces serving as an axial bearing in a substantially X-configuration, and wherein at least one of said side sections of said drive shaft comprises said neck of said gripping finger or of said connecting bar.

4. The gripper mechanism according to claim 2, wherein said drive shaft comprises said central section and two side sections, wherein at least one of said side sections of said drive shaft comprises said neck of said gripping finger or of said connecting bar, and wherein both of said side sections have end face sides with surfaces that are used as an axial bearing in a substantially O-configuration.

5. The gripper mechanism according to claim 2, wherein said gripping finger is controlled as a coupler of a control transmission which is simultaneously actuated by at least two drive shafts of multiple-section design and is also controlled unambiguously and securely in a final and extended position.

6. The gripper mechanism according to claim 5, wherein said gripping finger is a plurality of gripping fingers which are arranged about said actuating unit centrally positioned and driven synchronously by said actuating unit.

7. The gripper mechanism according to claim 2, wherein said slider drives said drive shaft via at least one coupler member pivotably attachable to said drive shaft and said slider.

8. The gripper mechanism according to claim 7, wherein said gripping finger is at least two gripping fingers each being attachable to a corresponding said drive shaft respectively, each of said drive shafts being pivotably attachable to a corresponding said coupler member respectively, and wherein said coupler members being pivotably attachable to said slider opposite of each other.

9. The gripper mechanism according to claim 2, wherein said slider further comprising at least one tooth rack, and said drive shaft being a gear wheel shaft adapted to engage with and be driven by said tooth rack of said slider.

10. The gripper mechanism according to claim 9, wherein said gripping finger is at least two gripping fingers each being attachable to a corresponding said drive shaft respectively, said tooth rack of said slider being located on opposite ends of said slider and said slider being positionable between said gear wheel shafts allowing for said tooth racks to engage with a corresponding gear wheel shaft respectively.

11. The gripper mechanism according to claim 2, wherein said actuating unit comprising a piston and piston rod adapted to be slidably received in said first cavity of said gripper casing, said piston rod being attachable to said slider.

12. The gripper mechanism according to claim 2, wherein said the gripping finger comprising of two halves provided on opposite sides of said gripper casing and interconnected in a releasable manner exterior of said gripper casing via a jaw mounting member.

13. The gripper mechanism according to claim 2 further comprising a first cover attachable to said gripper casing adjacent said first cavity, and a second cover attachable to said gripper casing adjacent said second cavity.

14. A gripper mechanism comprising:
first and second moving gripping fingers each having a neck, or being driven by connecting bars each comprising a neck;
at least one drive shaft attachable to each of said gripping fingers and adapted to actuate said gripping finger, each of said drive shafts comprising at least a central section, and two axial surfaces on both sides of said central section;
a plurality of pins received in bores defined in at least one of said neck of said first and second gripping fingers or said neck of said connecting bars and in at least one of said two axial surfaces of said central section of at least one of said drive shafts, said pins being configured to align said necks of said gripping fingers or of said connecting bars and said central sections of said drive shafts parallel with an axis of rotation of said drive shafts respectively, said pins further being configured to transmit torque from said central section of said drive shaft to said gripping finger or said connecting bar respectively;
a slider driven by an actuating unit and attachable to at least one said drive shafts, said slider being adapted to cause rotary motion to said drive shaft attached thereto; and
a gripper casing comprising one integral piece having two interconnected cavities for the accommodation of said actuating unit in a first cavity and said drive shafts and said slider in a second cavity.

15. The gripper mechanism according to claim 14, wherein each of said drive shafts comprises said central section and two side sections, said central section having said axial surfaces, said axial surfaces serving as an axial bearing in a substantially X-configuration, and wherein at least one of said side sections of each of said drive shafts comprises said neck of said first or second gripping finger or of said connecting bar.

16. The gripper mechanism according to claim 14, wherein each of said first and second gripping fingers is a plurality of gripping fingers which are arranged about said actuating unit centrally positioned and driven synchronously by said actuating unit.

17. The gripper mechanism according to claim 14, wherein said slider drives said drive shafts via at least one coupler member pivotably attachable to each of said drive shafts and said slider.

18. The gripper mechanism according to claim 14, wherein said slider further comprising at least one tooth rack, and each of said drive shafts being a gear wheel shaft adapted to engage with and be driven by said tooth rack of said slider.

19. The gripper mechanism according to claim 14, wherein said actuating unit comprising a piston and piston rod adapted to be slidably received in said first cavity of said gripper casing, said piston rod being attachable to said slider.

20. The gripper mechanism according to claim 14, wherein said the gripping finger comprising of two halves provided on opposite sides of said gripper casing and interconnected in a releasable manner exterior of said gripper casing via a jaw mounting member.

21. The gripper mechanism according to claim 14, wherein each of said drive shafts comprise said central section and two side sections wherein at least one of said side sections of each of said drive shafts comprises said neck of said first or second gripping finger or of said connecting bar, and wherein both of said side sections have end face sides with surfaces that are used as an axial bearing in a substantially O-configuration.

* * * * *